United States Patent [19]

Clark et al.

[11] Patent Number: 5,346,874

[45] Date of Patent: Sep. 13, 1994

[54] DISTILLATE HYDROGENATION

[75] Inventors: Frederick T. Clark, Wheaton; Simon G. Kukes, Naperville; P. Donald Hopkins, St. Charles, all of Ill.

[73] Assignee: Amoco Corporation, Chicago, Ill.

[21] Appl. No.: 104,780

[22] Filed: Aug. 10, 1993

Related U.S. Application Data

[62] Division of Ser. No. 851,311, Mar. 16, 1992, Pat. No. 5,271,828.

[51] Int. Cl.$^5$ .......................... B01J 21/02; B01J 29/00
[52] U.S. Cl. .................................................. 502/207
[58] Field of Search ........................................ 502/207

[56] References Cited

U.S. PATENT DOCUMENTS

| | | | |
|---|---|---|---|
| 3,943,053 | 3/1976 | Kovach et al. | 502/339 |
| 4,268,420 | 5/1981 | Klotz | 502/207 |
| 4,451,685 | 5/1984 | Nevitt et al. | 502/207 |
| 4,725,570 | 2/1988 | Sikkenga et al. | 502/204 |

*Primary Examiner*—Carl F. Dees
*Attorney, Agent, or Firm*—Thomas A. Yassen; Richard A. Kretchmer

[57] ABSTRACT

A process and catalyst is provided for the hydrogenation of a hydrocarbon feedstock comprising a substantial portion of a distillate hydrocarbon feedstock, wherein said distillate hydrocarbon feedstock consists essentially of material boiling between about 150° F. and about 700° F. at atmospheric pressure, which comprises reacting the feedstock with hydrogen at hydrogenation conditions in the presence of a catalyst comprising from about 0.1% to about 2.0% by weight of palladium and from about 0.1% to about 2.0% by weight of platinum and a support comprising borosilicate, for producing a hydrogenated product.

7 Claims, No Drawings

DISTILLATE HYDROGENATION

This application is a division of U.S. patent application Ser. No. 07/851,311, filed Mar. 16, 1992 U.S. Pat. No. 5,271,828, for Distillate Hydrogenation.

BACKGROUND OF THE INVENTION

This invention relates to a process and catalyst for reducing the aromatics and olefins content of hydrocarbon distillate products. More particularly, this process relates to an improved catalytic hydrogenation process and catalyst wherein the catalyst comprises platinum and palladium incorporated onto a support comprising borosilicate.

For the purpose of the present invention, the term "hydrogenation" is intended to be generic to the terms "hydrotreating" and "hydroprocessing," and involves the conversion of hydrocarbons at operating conditions selected to effect a chemical consumption of hydrogen. Included within the processes intended to be encompassed by the term "hydrogenation" are aromatic hydrogenation, dearomatization, ring-opening, hydrorefining (for nitrogen removal and olefin saturation), and desulfurization (often included in hydrorefining). These processes are all hydrogen-consuming and generally exothermic in nature. For the purpose of the present invention, distillate hydrogenation does not include distillate hydrocracking which is defined as a process wherein at least 15% by weight of the distillate feedstock boiling above 430° F. at atmospheric pressure is converted to products boiling below 430° F.

Petroleum refiners are now facing the scenario of providing distillate fuels, boiling in the range of from about 150° F. to about 700° F., with substantially reduced sulfur and aromatics contents. Sulfur removal is relatively well defined, and at constant pressure and adequate hydrogen supply, is generally a function of catalyst and temperature.

Aromatics removal presents a substantially more difficult challenge. Aromatics removal is generally a function of pressure, temperature, catalyst, and the interaction of these variables on the chemistry and thermodynamic equilibria of the dearomatization reaction. The dearomatization process is further complicated by the wide variances in the aromatics content of the various distillate component streams comprising the hydrogenation process feedstock, the dynamic nature of the flowrates of the various distillate component streams, and the particular mix of mono-aromatics and polycyclic aromatics comprising the distillate component streams.

The criteria for measuring aromatics compliance can pose additional obstacles to aromatics removal processes. The test for measuring aromatics compliance can be, in some regions, the FIA aromatics test (ASTM D1319), which classifies mono-aromatics and polycyclic aromatics equally as "aromatics." Hydrogenation to mono-aromatics is substantially less difficult than saturation of the final ring due to the resonance stabilization of the monoaromatic ring. Due to these compliance requirements, hydrogenation to mono-aromatics may be inadequate. Dearomatization objectives may not be met until a sufficient amount of the polycyclic aromatics and mono-aromatics are fully converted to saturated hydrocarbons.

While dearomatization can require a considerable capital investment on the part of most refiners, dearomatization can provide ancillary benefits. Distillate aromatics content is inextricably related to cetane number, the accepted measure of diesel fuel quality. The cetane number is highly dependent on the paraffinicity of molecular structures, whether they are straight-chain or alkyl attachments to rings. A distillate stream which comprises mostly aromatic rings with few or no alkyl-side chains generally is of lower cetane quality while a highly paraffinic stream is generally of higher cetane quality.

Dearomatization of refinery distillate streams can increase the volume yield of distillate products. Aromatic distillate components are generally lower in API gravity than their similarly boiling paraffinic counterparts. Saturation of aromatic rings can convert these lower API gravity aromatic components to higher API gravity saturated components and expand the volume yield of distillate product thereby compensating partially for the cost of hydrogen and facilities.

Dearomatization of refinery distillate streams can also provide increased desulfurization and denitrogenation beyond ordinary levels attendant to conventional distillate hydrogenation processes. Processes for the dearomatization of refinery distillate streams can require the construction of a new dearomatization facility, the addition of a second-stage dearomatization step to an existing distillate hydrogenation facility, or other processing options upstream of distillate hydrogenation or at the hydrogenation facility proper. These dearomatization steps can further reduce the nitrogen and sulfur concentrations of the distillate component and product streams, thus reducing desulfurization and denitrogenation catalyst and temperature requirements in existing distillate hydrogenation facilities designed primarily for hydrorefining. Reduced distillate sulfur and nitrogen concentrations can additionally increase the value of these streams for use as blending stocks to sulfur-constrained liquid fuel systems and as fluid catalytic cracking unit (FCC) feed.

While distillate dearomatization can provide cetane number improvement, volume expansion, and additional desulfurization and denitrogenation, the process has seldom been attractive in view of the large capital costs and the fact that many refiners have not reached distillate cetane limitations. Now that legislation exists and further legislation is being considered to mandate substantial reductions in distillate aromatics content, the demand for distillate dearomatization processes is now being largely determined by the incentive to remain in the business of selling distillates.

Hydrogenation processes and catalysts for the treatment of distillate streams has been the subject of several patents. U.S. Pat. Nos. 3,736,252, 3,773,654, 3,969,222, 4,014,783, 4,070,272, 4,202,753, 4,610,779 and 4,960,505 are all directed towards processes for hydrogenating and dearomatizing distillate fuels.

The use of borosilicate in catalyst supports for distillate dearomatization is particularly rare. The molecular sieves including borosilicate and the zeolites in general, have not been commonly used in hydrogenation processes because the silica content, in combination with common commercial hydrogenation metals, such as nickel, molybdenum, and cobalt, can provide lower desulfurization activity, have a tendency to promote undesired cracking reactions, and can be prone to early deactivation. For this reason, catalyst support components comprising borosilicate have been more typically found in processes such as catalytic cracking, hydrocracking, dewaxing of lubricating oils, naphtha dehydrogenation, and the isomerization of alkyl aromatics.

U.S. Pat. No. 4,560,469 to Hopkins et al. discloses such a process for catalytically dewaxing lubricating oils utilizing a catalyst comprising nickel on a borosilicate molecular sieve. The dewaxing process is directed at converting high pour point paraffins present in lubricating oils to lower pour point components to improve automobile cold start performance.

U.S. Pat. No. 4,433,190 to Sikkenga et al. discloses a process for dehydrogenating normal butane into a mixture of isobutylene, isobutane, and normal butene using a catalyst comprising an AMS-1B crystalline borosilicate sieve and containing an ion or molecule of a noble metal. The dehydrogenation process is directed at dehydrogenating normal butane, an inexpensive refinery by-product, into a feedstock for polymerization processes.

U.S. Pat. No. 4,654,456 to Nimry discloses a process for isomerizing xylene utilizing a catalyst comprising a HAMS-1B crystalline borosilicate molecular sieve impregnated with a phosphorous compound.

The use of metal mixtures on a catalyst support has also been the subject of research. (See P. N. Rylander, Catalytic Hydrogenation over Platinum Metals, Academic Press, New York 1967.) Rylander teaches that two platinum metal catalysts, when used together, can give better rates or better yields than either catalyst individually. However, except for certain selected examples, there seems to be no way of predicting when mixtures of catalysts will prove advantageous. A useful guide as to the probable effectiveness of coprecipitated metal catalysts, is the performance of a mechanical mixture of the two metals. (See Rylander, at pages 9–11.)

U.S. Pat. No. 3,943,053 to Kovach et al. discloses a hydrogenation process using a catalyst comprising a particular mixture of platinum and palladium on an inert oxide support such as beta, eta, or gamma alumina. The process provides gasoline and distillate hydrogenation, but with limited hydrogenation activity. The process particularly avoids use of silica-alumina supports since use of silica-alumina in gasoline service can result in the conversion of high octane benzene into substantially lower octane cyclohexane.

We have surprisingly found that catalysts and processes having a catalyst incorporating metal mixtures of platinum and palladium onto a support comprising borosilicate, result in substantially improved hydrogenation compared to prior art hydrogenation processes including processes having a catalyst incorporating platinum and/or palladium on an alumina support or on supports comprising various zeolites. These results are more surprising and unpredictable in view of the fact that it has also been found that catalysts and processes having a catalyst incorporating metal mixtures of platinum and palladium onto a support comprising Other 10-membered ring pentasils, such as ZSM-5, are less effective for hydrogenation.

We have also found that processes having a catalyst incorporating metallic mixtures of platinum and palladium, together incorporated onto a support comprising borosilicate, result in substantially improved hydrogenation compared to processes utilizing physical mixtures of catalysts comprising platinum incorporated onto a borosilicate support and palladium incorporated onto a borosilicate support. This particular synergy is more profound (and in contradistinction to the teachings of Rylander) since physical mixtures of platinum and palladium on a support comprising borosilicate have been shown not to provide improved hydrogenation.

It is therefore an object of the present invention to provide a process and catalyst that provide improved distillate aromatics saturation.

It is an object of the present invention to provide a process and catalyst that provide improved distillate desulfurization and denitrogenation.

It is an object of the present invention to provide a process and catalyst that increase distillate cetane number.

It is an object of the present invention to provide a process and catalyst that expand the volume of the distillate feedstock.

Other objects appear herein.

SUMMARY OF THE INVENTION

The above objects can be achieved by providing a process for the hydrogenation of a hydrocarbon feedstock comprising a substantial portion of a distillate hydrocarbon feedstock, wherein said distillate hydrocarbon feedstock consists essentially of material boiling between about 150° F. and about 700° F. at atmospheric pressure, which comprises reacting the feedstock with hydrogen at hydrogenation conditions in the presence of a catalyst comprising from about 0.1% to about 2.0% by weight of palladium and from about 0.1% to about 2.0% by weight of platinum on a support comprising borosilicate, for producing a hydrogenated product.

In another embodiment, the above objects can be achieved by providing a hydrogenation catalyst suitable for hydrogenation of a hydrocarbon feedstock comprising from about 0.1% to about 2.0% by weight of palladium and from about 0.1% to about 2.0% by weight of platinum, each incorporated onto a support comprising a refractory oxide matrix and borosilicate, wherein the borosilicate, calculated as oxide, comprises from about 30% to about 60% by weight of the support.

The process and catalyst of the present invention provide significant advantages over comparative processes such as those described in U.S. Pat. No. 3,943,053, which teaches distillate dearomatization using platinum and palladium on an alumina support. The process and catalyst of the present invention provide substantially improved dearomatization performance which permits petroleum refiners to meet future distillate product aromatics constraints at minimum cost.

The process and catalyst of the present invention provide increased desulfurization and denitrogenation over prior art processes. This improved desulfurization and denitrogenation can result in a reduction in first-stage hydrorefining catalyst or temperature requirements, increase the attractiveness of using desulfurized distillate to blend down plant fuel sulfur levels for $SO_2$ environmental compliance, and increase the attractiveness of catalytically cracking desulfurized distillates.

The process and catalyst of the present invention provide increased product cetane numbers over prior art processes. Improved distillate product cetane number can reduce costly cetane improver additive requirements and increase premium (high cetane) distillate production capacity.

The process and catalyst of the present invention provide increased distillate volume expansion to meet customer distillate demands at incrementally lower crude run.

BRIEF DESCRIPTION OF THE INVENTION

The hydrocarbon feedstock suitable for use with the present invention generally comprises a substantial portion of a distillate hydrocarbon feedstock, wherein a "substantial portion" is defined as, for purposes of the present invention, at least 50% of the total feedstock by volume. The distillate hydrocarbon feedstock processed in the present invention consists essentially of any one, several, or all refinery streams boiling in a range from about 150° F. to about 700° F., preferably 300° F. to about 700° F., and more preferably between about 350° F. and about 700° F. at atmospheric pressure. For the purpose of the present invention, the term "consisting essentially of" is defined as at least 95% of the feedstock by volume. The lighter hydrocarbon components in the distillate product are generally more profitably recovered to gasoline and the presence of these lower boiling materials in distillate fuels is often constrained by distillate fuel flash point specifications. Heavier hydrocarbon components boiling above 700° F. are generally more profitably processed as FCC feed and converted to gasoline. The presence of heavy hydrocarbon components in distillate fuels is further constrained by distillate fuel end point specifications.

The distillate hydrocarbon feedstock can comprise high and low sulfur virgin distillates derived from high- and low-sulfur crudes, coker distillates, catalytic cracker light and heavy catalytic cycle oils, and distillate boiling range products from hydrocracker and resid hydrotreater facilities. Generally, coker distillate and the light and heavy catalytic cycle oils are the most highly aromatic feedstock components, ranging as high as 80% by weight (FIA). The majority of coker distillate and cycle oil aromatics are present as monoaromatics and di-aromatics with a smaller portion present as tri-aromatics. Virgin stocks such as high and low sulfur virgin distillates are lower in aromatics content ranging as high as 20% by weight aromatics (FIA). Generally, the aromatics content of a combined hydrogenation facility feedstock will range from about 5% by weight to about 80% by weight, more typically from about 10% by weight to about 70% by weight, and most typically from about 20% by weight to about 60% by weight. In a distillate hydrogenation facility with limited operating capacity, it is generally preferable (most economical) to process feedstocks in order of highest aromaticity, since catalytic processes often proceed to equilibrium product aromatics concentrations. In this manner, maximum distillate pool dearomatization is generally achieved.

The distillate hydrocarbon feedstock sulfur concentration is generally a function of the high and low sulfur crude mix, the hydrogenation capacity of a refinery per barrel of crude capacity, and the alternative dispositions of distillate hydrogenation feedstock components. The higher sulfur distillate feedstock components are generally virgin distillates derived from high sulfur crude, coker distillates, and catalytic cycle oils from fluid catalytic cracking units processing relatively higher sulfur feedstocks. These distillate feedstock components can range as high as 2% by weight elemental sulfur but generally range from about 0.1% by weight to about 0.9% by weight elemental sulfur. Where a hydrogenation facility is a two-stage process having a first-stage denitrogenation and desulfurization zone and a second-stage dearomatization zone, the dearomatization zone feedstock sulfur content can range from about 100 ppm to about 0.9% by weight or as low as from about 10 ppm to about 0.9% by weight elemental sulfur.

The distillate hydrocarbon feedstock nitrogen content is also generally a function of the nitrogen content of the crude oil, the hydrogenation capacity of a refinery per barrel of crude capacity, and the alternative dispositions of distillate hydrogenation feedstock components. The higher nitrogen distillate feedstocks are generally coker distillate and the catalytic cycle oils. These distillate feedstock components typically have total nitrogen concentrations ranging as high as 2,000 ppm, but generally range from about 1 ppm to about 900 ppm.

Where the particular hydrogenation facility is a two-stage process in accordance with the present invention, the first stage is often designed to desulfurize and denitrogenate, and the second stage is designed to dearomatize. In these operations, the feedstocks entering the dearomatization stage are substantially lower in nitrogen and sulfur content and can be lower in aromatics content than the feedstocks entering the hydrogenation facility. It can often be less costly for a refiner to add a second dearomatization stage to an existing hydrogenation facility to save capital costs than to build a new stand-alone facility.

The hydrogenation process of the present invention generally begins with a distillate feedstock preheating step. The feedstock is preheated in feed/effluent heat exchangers prior to entering a furnace for final preheating to a targeted reaction zone inlet temperature. The feedstock can be contacted with a hydrogen stream prior to, during, and/or after preheating. The hydrogen-containing stream can also be added in the hydrogenation reaction zone of a single-stage hydrogenation process or in either the first or second stage of a two-stage hydrogenation process.

The hydrogen stream can be pure hydrogen or can be in admixture with diluents such as low-boiling hydrocarbons, carbon monoxide, carbon dioxide, nitrogen, water, sulfur compounds, and the like. The hydrogen stream purity should be at least about 50% by volume hydrogen, preferably at least about 65% by volume hydrogen, and more preferably at least about 75% by volume hydrogen for best results. Hydrogen can be supplied from a hydrogen plant, a catalytic reforming facility, or other hydrogen-producing or hydrogen-recovery processes.

The reaction zone can consist of one or more fixed bed reactors containing the same or different catalysts. Two-stage processes can be designed with at least one fixed bed reactor for desulfurization and denitrogenation, and at least one fixed bed reactor for dearomatization. A fixed bed reactor can also compose a plurality of catalyst beds. The plurality of catalyst beds in a single fixed bed reactor can also comprise the same or different catalysts. Where the catalysts are different in a multi-bed fixed bed reactor, the initial bed or beds are generally for desulfurization and denitrogenation, and subsequent beds are for dearomatization.

Since the hydrogenation reaction is generally exothermic, interstage cooling, consisting of heat transfer devices between fixed bed reactors or between catalyst beds in the same reactor shell, can be employed. At least a portion of the heat generated from the hydrogenation process can often be profitably recovered for use in the hydrogenation process. A suitable heat sinks for absorbing such heat provided by the hydrogenation reaction exotherm can and generally includes the feedstock preheat section of the hydrogenation process upstream of the reactor preheat furnace described hereabove. Where this heat recovery option is not available, cooling of the reaction zone effluent may be performed through cooling utilities such as cooling water or air, or through use of a hydrogen quench stream injected directly into the reactors. Two-stage processes can often provide reduced temperature exotherm per reactor shell and provide better hydrogenation reactor temperature control.

The reaction zone effluent is generally cooled and the effluent stream is directed to a separator device to remove the hydrogen. Some of the recovered hydrogen can be recycled back to the process while some of the hydrogen can be purged to external systems such as plant or refinery fuel. The hydrogen purge rate is often controlled to maintain a minimum hydrogen purity and to remove hydrogen sulfide. Recycled hydrogen is generally compressed, supplemented with "make-up" hydrogen, and reinjected into the process for further hydrogenation.

The separator device liquid effluent can then be processed in a stripper device where light hydrocarbons can be removed and directed to more appropriate hydrocarbon pools. The stripper liquid effluent product is then generally conveyed to blending facilities for production of finished distillate products.

Operating conditions to be used in the hydrogenation process of the present invention include an average reaction zone temperature of from about 400° F. to about 750° F., preferably from about 500° F. to about 700° F., and most preferably from about 525° F. to about 625° F. for best results. Reaction temperatures below these ranges can result in less effective hydrogenation. Excessively high temperatures can cause the process to reach a thermodynamic aromatic reduction limit, hydrocracking, catalyst deactivation, and increase energy costs. Desulfurization, in accordance with the process of the present invention, is generally less effected by reaction zone temperature than prior art processes, especially at feed sulfur levels below 500 ppm, such as in the second-stage dearomatization zone of a two-stage process.

The process of the present invention generally operates at reaction zone pressures ranging from about 300 psig to about 2,000 psig, more preferably from about 500 psig to about 1,500 psig, and most preferably from about 600 psig to about 1,200 psig for best results. Hydrogen circulation rates generally range from about 500 SCF/Bbl to about 20,000 SCF/Bbl, preferably from about 1,000 SCF/Bbl to about 15,000 SCF/Bbl, and most preferably from about 3,000 to about 13,000 SCF/Bbl for best results. Reaction pressures and hydrogen circulation rates below these ranges can result in higher catalyst deactivation rates resulting in less effective desulfurization, denitrogenation, and dearomatization. Excessively high reaction pressures increase energy and equipment costs and provide diminishing marginal benefits. The process of the present invention generally operates at a liquid hourly space velocity (LHSV) of from about 0.2 hr$^{-1}$ to about 10.0 hr$^{-1}$, preferably from about 0.5 hr$^{-1}$ to about 4.0 hr$^{-1}$, and most preferably from about 1.0 hr$^{-1}$ to about 2.0 hr$^{-}$ for best results. Excessively high space velocities will result in reduced overall hydrogenation.

The process and catalyst of the present invention comprise a catalyst having a crystalline borosilicate molecular sieve and a hydrogenation metals component comprising palladium and platinum.

Crystalline borosilicate molecular sieves of the AMS type are preferred and have the following composition in terms of mole ratios of oxides:

$$0.9 \pm 0.2\ M_{2/n}O:B_2O_3:ySiO_2:zH_2O$$

wherein M is at least one cation having a valence of n, y ranges from about 4 to about 600, and z ranges from 0 to about 160, and provide an X-ray diffraction pattern comprising the following X-ray lines and assigned strengths:

| d-Spacing (Å) | Assigned Strength |
|---|---|
| 11.2 ± 0.2 | W-VS |
| 10.0 ± 0.2 | W-MS |
| 5.97 ± 0.07 | W-M |
| 3.82 ± 0.05 | VS |
| 3.70 ± 0.05 | MS |
| 3.62 ± 0.05 | M-MS |
| 2.97 ± 0.02 | W-M |
| 1.99 ± 0.02 | VW-M |

For ease of reporting X-ray diffraction results, relative intensities (relative peak heights) were arbitrarily assigned the following values:

| Relative Peak Height | Assigned Strength |
|---|---|
| less than 10 | VW (very weak) |
| 10-19 | W (weak) |
| 20-39 | M (medium) |
| 40-70 | MS (medium strong) |
| greater than 70 | VS (very strong) |

Such crystalline borosilicates are typically prepared by reaction of boron oxide, a silicon-containing material, and a quaternary ammonium compound in a basic medium such as a metal or ammonium hydroxide. The preferred borosilicate, by virtue of its superior stability and selectivity, is the AMS-1B type which is in the sodium form as synthesized. For improved catalytic activity AMS-1 B can be converted to the hydrogen form, HAMS-1 B, by ammonium exchange followed by calcination. Further details with respect to these crystalline borosilicate molecular sieve cracking components are found in commonly assigned U.S. Pat. No. 4,269,813 to Klotz, which is herein incorporated by reference, wherein the AMS-1B crystalline borosilicate molecular sieve is disclosed.

AMS-1B crystalline borosilicate molecular sieves can also be prepared by crystallizing a mixture of an oxide of silicon, an oxide of boron, an alkylammonium compound, and ethylenediamine. This method is carded out in a manner such that the initial reactant molar ratios of water to silica range from about 5 to about 25, preferably from about 10 to about 22, and more preferably from about 10 to about 15 for best results. In addition, preferable molar ratios for initial reactant silica to oxide of boron range from about 4 to about 150, preferably from about 5 to about 80, and more preferably from about 5 to about 20 for best results. The molar ratio of ethylenediamine to silicon oxide used in the preparation of AMS-1B crystalline borosilicate should range from about 0.05 to about 5.0, preferably from about 0.1 to about 1.0, and more preferably from about 0.2 to about 0.5 for best results. The molar ratio of alkylammonium template compound or precursor to silicon oxide useful in the preparation of this invention ranges from 0 to about 1.0 or above, preferably from about 0.005 to about 0.1, and more preferably from about 0.005 to about 0.02 for best results. The silica source is preferably a low sodium content silica source containing less than 2,000 ppm sodium and more preferably less than 1000 ppm sodium, such as Ludox HS-40 which contains about 40 wt % $SiO_2$ and 0.08 wt % $Na_2O$ or Nalco 2327 which has similar specifications.

It is noted that the preferable amount of alkylammonium template compound used in the instant preparation method is substantially less than that required to produce AMS-1B conventionally using an alkali metal cation base.

The borosilicate prepared by the instant method typically contains at least 9,000 ppm boron and less than about 100 ppm sodium and is designated as HAMS-1B-3. The HAMS-1B-3 crystalline borosilicate has a higher boron content and a lower sodium content than crystalline borosilicates formed using conventional techniques.

Although not required, it is preferred to employ the crystalline borosilicate molecular sieve, combined, dispersed, or otherwise admixed in a matrix of at least one nonmolecular sieve, porous refractory oxide matrix material as the use of such matrix material facilitates provision of the ultimate catalyst in a shape or form well suited for the process use. Useful matrix components include alumina, silica, silica alumina, zirconia, titania, and various combinations thereof and will typically be of a surface area of greater than about 5 $m^2/g$. The matrix material can also contain various adjuvants such as phosphorus oxides, boron oxides, and/or halogens such as fluorine or chlorine.

The borosilicate molecular sieve component is generally present in the support in an amount ranging from about 20% by weight to about 70% by weight, preferably from about 30% by weight to about 60% by weight, and more preferably from about 35% by weight to about 45% by weight for best results. Molecular sieve component concentrations as a percentage of the support, in a range of from about 35% by weight to about 45% by weight, are particularly preferred because it has been found, from hexane cracking tests, that these particular sieve concentrations maximize catalyst acidity. It has also been found that hydrogenation catalyst support acidity is correlated to carbonium-ion reactions and, in particular, dearomatization. Borosilicate molecular sieve concentrations below or above the preferred ranges can result in reduced dearomatization performance. While not wishing to be bound to any particular theory, it is believed that lower or higher molecular sieve concentrations can result in a reduction in active sites, believed to be created from and depend on the mixing of borosilicate and alumina crystallites during the gellation step in catalyst preparation.

Methods for dispersing molecular sieve materials within a matrix component are generally well-known to persons skilled in the art and applicable with respect to the borosilicate molecular sieve materials employed in accordance with the present invention. A preferred method is to blend the molecular sieve component, preferably in a finely divided form, into a sol, hydrosol, or hydrogel of an inorganic oxide, and then add a gelling medium such as ammonium hydroxide to the blend with stirring to produce a gel. The resulting gel can be dried, dimensionally formed if desired, and calcined. Drying is preferably conducted in air at a temperature of about 80° F. to about 350° F. (about 27° C. to about 177° C.) for a period of several seconds to several hours. Calcination is preferably conducted by heating in air at about 932° F. to about 1202° F. (about 500° C. to about 650° C.) for a period of time ranging from about 0.5 hours to about 16 hours.

Another suitable method for preparing a dispersion of molecular sieve component in a refractory inorganic oxide matrix component is to dry blend particles of each, preferably in finely divided form, and then to dimensionally form the dispersion if desired.

The crystalline borosilicate molecular sieve component can be subsequently treated, either by mild atmospheric steaming (e.g., steaming with up to 100% steam and at elevated temperatures, such as about 1,000° F., for example) for several hours or by subjecting the support comprising borosilicate to a basic (e.g., $NH_4OH$) autogenous environment at an elevated temperature (e.g., 350° F.) for several days such as in an autoclave in a treatment step, prior to metals impregnation. However, it has been found that this procedure generally results in less effective dearomatization. While not wishing to be bound by any particular theory, it is believed that subjecting the support to a basic autogenous environment can incorporate stronger acidity into the support, resulting in high initial dearomatization activity. However, such initial activity can result in increased catalyst coking and more rapid catalyst deactivation.

The hydrogenation metals component of the process and catalyst of the present invention includes palladium and platinum. These metals can be present in the catalyst in their elemental form or as their oxides, sulfides, or mixtures thereof. The palladium and platinum are each generally present in an amount ranging from about 0.1% by weight to about 2.0% by weight, preferably from about 0.2% by weight to about 1.5% by weight, and more preferably from about 0.3% by weight to about 1.2% by weight based on the total weight of the catalyst (including the molecular sieve component, the refractory oxide matrix, and the hydrogenation metals) and calculated as oxide, for best results. Catalyst metals contents outside of these total metals content ranges can be less economic. Higher metals contents can require more total hydrogenation component due to reduced dispersion and feed/catalyst contact. Lower metals contents can result in increased support material, catalyst handling, transportation, and capital costs.

The weight ratio of elemental palladium to elemental platinum generally ranges from about 10:1 to 1:10 and preferably from about 5:1 to 1:5 for best results. Foregoing one of the hydrogenation metals or using a mixture outside of the weight ratio ranges can result in less effective hydrogenation.

The hydrogenation metals component can be deposed or incorporated upon the support by impregnation employing heat-decomposable salts of platinum and palladium or other methods known to those skilled in the art such as ion-exchange, with impregnation methods being preferred. The platinum and palladium can be impregnated onto the support separately, or can be coimpregnated onto the support. Suitable aqueous impregnation solutions include, but are not limited to, chloroplatinic acid, palladium chloride, tetraamine palladium chloride, and tetraamine platinum chloride.

Impregnation using tetraamine palladium chloride and tetraamine platinum chloride can be performed by precalcining the catalyst support, in the form of a powder, pellets, extrudates, or spheres and determining the amount of water that must be added to wet all of the material. The tetraamine palladium chloride and tetraamine platinum chloride are then dissolved in the calculated amount of water, and the solution added to the support in a manner such that the solution completely saturates the support. The tetraamine palladium chloride and tetraamine platinum chloride are added in a manner such that the aqueous solution contains the total amount of elemental palladium and platinum to be deposited on the given mass of support. Impregnation can be performed for each metal separately, including an intervening drying step between impregnations, or as a single coimpregnation step. The saturated support can then be separated, drained, and dried in preparation for calcining. Commercially, draining volumes can be reduced in order to reduce palladium and platinum losses and waste water handling costs, by providing less than the full amount of aqueous solution (such as from 90% to 100% by volume of aqueous solution) necessary to saturate all of the support. Calcination generally is performed at a temperature of from about 932° F. to about 1,202° F. (500° C. to about 650° C.), or more preferably from about 977° F. to about 1,067° F. (535° C. to about 575° C.) for best results.

The preferred finished hydrogenation catalyst is particularly durable and resilient to conditions encountered in typical petroleum refineries. Catalyst durability is commonly measured by crush strength. The crushing strength of the catalyst is determined by placing a catalyst pill on its side between two parallel, horizontal flat plates, one stationary and one movable. A gradually increasing force is applied to the movable plate perpendicular to the surface of the plate, until the pill breaks. The crushing strength for purpose of the present invention is the force, in pounds, applied at the instant of pill breakage divided by the length of the particular extrudate particle in millimeters. The reported crushing strength is generally the average value determined on 100 pills. The hydrogenation catalyst suitable for use in the present invention should have a crush strength for cylinder extrudate particles of 1/16 inches, of greater than 1.0 lb/ram, preferably greater than 1.3 lb/mm, and more preferably greater than 1.4 lb/ram for best results. High catalyst crush strengths can reduce catalyst breakage and replacement costs.

The process and catalyst of the present invention comprising hydrogenation of a distillate boiling range feedstock utilizing a catalyst comprising palladium and platinum and a support comprising borosilicate, provides superior dearomatization performance. Dearomatization performance is generally measured by the percentage of aromatics saturated, calculated as the weight percentage of aromatics in the hydrogenation process product subtracted from the weight percentage of aromatics in the feedstock divided by the weight percentage of aromatics in the feedstock. The hydrogenation process in accordance with the principles of the present invention can generally attain and sustain aromatics saturation levels of greater than 40%, greater than 50%, and as high as or higher than 70% and 80%. This high level of aromatics saturation provides for a hydrogenation process that can operate at less severe and costly operating conditions, prolonging catalyst life.

The hydrogenation process and catalyst of the present invention provide outstanding desulfurization and denitrogenation performance. The hydrogenation process in accordance with the principles of the present invention can generally attain product sulfur levels below 100 ppm, below 30 ppm, and below 10 ppm. The hydrogenation process in accordance with the principles of the present invention can generally attain product nitrogen levels below 30 ppm, below 10 ppm, and as low as 2 and even 1 ppm. This level of desulfurization and denitrogenation can result in a reduction in first-stage hydrorefining catalyst requirements, increase the attractiveness of using desulfurized distillate to blend down plant fuel sulfur levels for $SO_2$ environmental compliance, and increase the attractiveness of catalytically cracking desulfurized distillates.

The hydrogenation process and catalyst of the present invention provide a substantial increase in distillate product cetane number. Higher fluid catalytic cracking severity has resulted in FCC distillate products having lower cetane numbers, adding cetane limitations in refinery distillate pools that previously may not have existed. The hydrogenation process in accordance with the principles of the present invention can generally achieve product cetane number improvements of over 4 numbers, over 8 numbers, and as high as 12 numbers. Improved cetane production can reduce costly cetane improver additive requirements and increase premium (high cetane) distillate production capacity.

The hydrogenation process and catalyst of the present invention provide substantial distillate volume expansion. Distillate volume expansion is generally measured by the reduction in specific gravity across the hydrogenation process and is calculated as the specific gravity of the hydrogenation process product subtracted from the specific gravity of the feedstock divided by the specific gravity of the feedstock. The hydrogenation process in accordance with the principles of the present invention can expand the volume of the distillate feedstock by more than 2%, more than 3.5%, and more than 5.0%. Volume expansion across a distillate hydrogenation process can permit petroleum refiners to meet customer distillate demands at incrementally lower crude run.

The hydrogenation catalyst of the present invention is durable and resilient. The hydrogenation catalyst used in the process of the present invention has a crush strength generally comparable to that utilized in prior art processes. A more durable hydrogenation catalyst prolongs catalyst life and reduces catalyst replacement costs.

The present invention is described in further detail in connection with the following examples, it being understood that the same are for purposes of illustration and not limitation.

EXAMPLE 1

A hydrogenation catalyst in accordance with the present invention and comprising a borosilicate molecular sieve support material was prepared by mixing 250.0 grams of distilled water and 1 cc of concentrated ammonium hydroxide (29% ammonia) in an autoclave. A basket containing 51.0 grams of AMSAC-3400 1/16 inch extrudate borosilicate-containing molecular sieve support material (manufactured by American Cyanamid Company) was placed in the autoclave at an elevation above the liquid level of the mixture. The AMSAC-3400 extrudate comprised about 40% by weight HAMS 1B-3 borosilicate sieve (manufactured by AR-CHEM Chemical Company, Houston, Tex.) and about 60% by weight of a commercially available alumina sol (PHF alumina manufactured by American Cyanamid Company) and was prepared in a manner similar to that described in European Patent No. 0 184 461 to Haddad et al. and U.S. Pat. No. 4,725,570 to Haddad et al., the disclosures of which are hereby incorporated by reference. The properties of the AMSAC-3400 HAMS-1B-alumina support, the HAMS 1B-3 borosilicate sieve, and the alumina are provided in Table 1.

TABLE 1

|  | HAMS-ALUMINA | HAMS-1B-3 | ALUMINA |
|---|---|---|---|
| HAMS-1B-3, Wt % | 40 | 100 | 0 |
| Alumina | 60 | 0 | 100 |
| Na, ppm | 66 | 93 | — |
| Fe, ppm | 200 | 254 | — |
| Boron, Wt % (Net Chem) | 0.54 | 1.29 | — |
| Boron, Wt % (XRD) | 0.50 | 0.74 | — |
| Cryst. HAMS, Wt % (XRD) | 17 | 76 | — |
| Pore Volume, cc/Gram | 0.96 | — | 0.60 |
| BET Area, $M^2$/Gram | 339 | — | 1.98 |

The autoclave was sealed and heated to 347° F. (175° C.) for a period of 64 hours. The extrudate was removed from the autoclave and put in an oven at 250° F. (121° C.) for a period of 12 hours and calcined at 932° F. (500° C.) for a period of 3 hours.

The borosilicate-containing molecular sieve support material was co-impregnated using incipient wetness techniques with an aqueous solution of a sufficient amount of tetraamine palladium chloride and tetraamine platinum chloride to provide a hydrogenation catalyst having 0.25 wt % elemental palladium and 0.25 wt % elemental platinum. The catalyst was dried at 250° F. (121° C.) for 12 hours and calcined at 1000° F. (538° C.) for 3 hours. The catalyst was designated as Catalyst 1 and the composition and properties of the catalyst are specified in Table 3.

EXAMPLE 2

A hydrogenation catalyst in accordance with the present invention and comprising a borosilicate molecular sieve support material was prepared in a manner similar to that described in Example 1 except that the ammonium hydroxide acidity treatment step was omitted. The AMSAC-3400 1/16 inch extrudate borosilicate-containing molecular sieve support material was co-impregnated using incipient wetness techniques with an aqueous solution of a sufficient amount of tetraamine palladium chloride and tetraamine platinum chloride in water to provide a hydrogenation catalyst having 0.25 wt % elemental palladium and 0.25 wt % elemental platinum. The catalyst was dried at 250° F. (121° C.) for 12 hours and calcined at 1000° F. (538° C.) for 3 hours. The crush strength of the catalyst was determined to be 1.49 lb/min. The catalyst was designated as Catalyst 2 and the composition and properties of the catalyst are specified in Table 3.

EXAMPLE 3

A hydrogenation catalyst comprising a borosilicate molecular sieve support material was prepared in a manner similar to that described in Example 2 except that only palladium was impregnated onto the catalyst support. The AMSAC-3400 1/16 inch extrudate borosilicate-containing molecular sieve support material was impregnated using incipient wetness techniques with an aqueous solution of a sufficient amount of tetraamine palladium chloride in water to provide a hydrogenation catalyst having 0.50 wt % elemental palladium. The catalyst was dried at 250° F. (121° C.) for 12 hours and calcined at 1000° F. (538° C.) for 3 hours. The catalyst was designated as Catalyst 3 and the composition and properties of the catalyst are specified in Table 3.

EXAMPLE 4

A hydrogenation catalyst comprising a borosilicate molecular sieve support material was prepared in a manner similar to that described in Example 2 except that only platinum was impregnated onto the catalyst support. The AMSAC-3400 1/16 inch extrudate borosilicate-containing molecular sieve support material was impregnated using incipient wetness techniques with an aqueous solution of a sufficient amount of tetraamine platinum chloride in water to provide a hydrogenation catalyst having 0.50 wt % elemental platinum. The catalyst was dried at 250° F. (1 21 ° C.) for 12 hours and calcined at 1000° F. (538° C.) for 3 hours. The catalyst was designated as Catalyst 4 and the composition and properties of the catalyst are specified in Table 3.

EXAMPLE 5

A hydrogenation catalyst was prepared as a 50%/50% physical mixture of the hydrogenation catalysts of Examples 3 and 4. The catalyst was designated as Catalyst 5 and the composition and properties of the catalyst are specified in Table 3.

EXAMPLE 6

Comparative hydrogenation catalysts were prepared for comparison with the hydrogenation catalysts of the present invention (Examples 6–11).

A hydrogenation catalyst comprising an alumina support component was prepared by extruding PHF alumina into 1/16 inch extrudates, drying the extrudate at 248° F. (120° C.) for 12 hours, and calcining the extrudate at 1000° F. (538° C.) for 10 hours. The amount of water required to saturate and fill the pores of the support was determined and an aqueous impregnation solution was prepared with this amount of water and a sufficient amount of tetraamine palladium chloride and tetraamine platinum chloride to provide a hydrogenation catalyst having 0.25 wt % elemental palladium and 0.25 wt % elemental platinum. The hydrogenation catalyst was dried for 12 hours at 248° F. (120° C.) and calcined at 1000° F. (538° C.) for 4 hours. The catalyst crush strength was determined to be 0.35 lb/mm. The catalyst was designated as Catalyst 6 and the composition and properties of the catalyst are specified in Table 3.

EXAMPLE 7

A hydrogenation catalyst comprising a ZSM-5 molecular sieve support material, wherein the ZSM-5 component had a silicon to aluminum atomic ratio of about 30:1, was prepared for comparison with the hydrogenation catalysts of the present invention. The catalyst was prepared by dissolving 3.75 lbs of sodium hydroxide, 2.36 lbs of sodium aluminate, 59.1 lbs of tetrapropyl ammonium bromide, and 96.0 lbs of a silica sol (Ludox HS-40 manufactured by Ludox Corporation) in 39.6 lbs of water in an autoclave. The autoclave was sealed and heated to 302° F. (150° C.) at autogenous pressure with continuous stirring for a period of 120 hours. The slurry was filtered and washed and the cake dried in an oven at 250° F. (121° C.) for a period of 12 hours.

The filter cake was ion exchanged with ammonium nitrate in water and heated, under reflux, at a temperature of about 144° F. (62° C.) for a period of 3 hours. The slurry was allowed to cool while stirring until the slurry reached a temperature of 113° F. (45° C.) and allowed to settle for a period of 12 hours. The slurry was decanted and filtered leaving a filter cake. The filter cake was ion exchanged two more times in accordance with the above procedure and washed with water.

The ion exchanged filter cake was co-impregnated using incipient wetness techniques with an aqueous solution of a sufficient amount of tetraamine palladium chloride and tetraamine platinum chloride in water to provide a hydrogenation catalyst having 0.25 wt % elemental palladium and 0.25 wt % elemental platinum. The ZSM-5 particulate comprising platinum and palladium was dried at room temperature for 12 hours.

The ZSM-5 particulate comprising platinum and palladium was mixed with PHF alumina for about 3 minutes and heated in an oven at a temperature of about 250° F. (121° C.) for 12 hours in a manner so as to provide a hydrogenation catalyst comprising 60% by weight ZSM-5 support component and 40% by weight alumina. The particulate was ground into a powder, moistened with water, and extruded into 1/16 inch extrudates. The extrudates were dried in an oven at 250° F. (121° C.) for 12 hours and calcined at 1000° F. (538° C.) for 3 hours. The catalyst crush strength was determined to be 1.25 lb/mm. The catalyst was designated as Catalyst 7 and the composition and properties of the catalyst are specified in Table 3.

EXAMPLE 8

A hydrogenation catalyst comprising a ZSM-5 molecular sieve support material, wherein the ZSM-5 component had a silicon to aluminum atomic ratio of about 120:1, was prepared in a manner similar to that described in Example 7. The catalyst was prepared by dissolving 3.75 lbs of sodium hydroxide, 0.59 lbs of sodium aluminate, 59.1 lbs of tetrapropyl ammonium bromide, and 96.0 lbs of a silica sol (Ludox HS-40 manufactured by Ludox Corporation) in 39.6 lbs of water in an autoclave. The autoclave was sealed and heated to 302° F. (150° C.) at autogenous pressure with continuous stirring for a period of 120 hours. The slurry was filtered and washed and the cake dried in an oven at 250° F. (121° C.) for a period of 12 hours.

The filter cake was ion exchanged three times, co-impregnated with an aqueous solution of a sufficient amount of tetraamine palladium chloride and tetraamine platinum chloride in water to provide a hydrogenation catalyst having 0.25 wt % elemental palladium and 0.25 wt % elemental platinum, and combined with alumina so as to provide a hydrogenation catalyst comprising 60% by weight ZSM-5 support component and 40% by weight alumina, in accordance with the procedures described in Example 7. The particulate was extruded into 1/16 inch extrudates, dried in an oven at 250° F. (121° C.) for 12 hours, and calcined at 1000° F. (538° C.) for 3 hours. The catalyst was designated as Catalyst 8 and the composition and properties of the catalyst are specified in Table 3.

EXAMPLE 9

A hydrogenation catalyst comprising a gallosilicate molecular sieve support material was prepared for comparison with the hydrogenation catalysts of the present invention. The catalyst was prepared by dissolving 222.94 grams of sodium hydroxide, 77.81 grams of gallium oxide, 1465.21 grams of tetrapropyl ammonium bromide, 547.57 grams of 2,4 pentedione, and 3568.0 grams of a silica sol (Ludox HS-40 manufactured by Ludox Corporation) in 10,299.7 grams of distilled water in an autoclave. The autoclave was sealed and maintained at a temperature of between 21 5° F. (102° C.) ! and 285° F. (140° C.), autogenous pressure, and a mixer speed ranging from about 200 rpm to about 333 rpm for a period of about 120 hours. The slurry was filtered and washed and the cake dried in an oven at 250° F. (121° C.) for a period of 12 hours and calcined at 1000° F. (538° C.) for a period of 4 hours.

The filter cake was ion exchanged with ammonium nitrate in water and heated, under reflux, at a temperature of about 160° F. (71° C.) for a period of 4 hours. The slurry was allowed to cool while stirring for 2 hours and allowed to settle for a period of 12 hours. The slurry was decanted and filtered leaving a filter cake. The filter cake was calcined at 1000° F. (538° C.) for a period of 4 hours. The filter cake was ion exchanged two more times in accordance with the above procedure and washed with water.

The ion exchanged filter cake was co-impregnated using incipient wetness techniques with an aqueous solution of a sufficient amount of tetraamine palladium chloride and tetraamine platinum chloride in water to provide a hydrogenation catalyst having 0.25 wt % elemental palladium and 0.25 wt % elemental platinum. The gallosilicate particulate comprising platinum and palladium was dried at 250° F. (121° C.) for 12 hours.

The gallosilicate particulate comprising platinum and palladium was mixed with PHF alumina for about 6 minutes and heated in an oven at a temperature of about 250° F. (121° C.) for 12 hours in a manner so as to provide a hydrogenation catalyst comprising 60% by weight gallosilicate support component and 40% by weight alumina. The particulate was ground into a powder, moistened with water, and extruded into 1/16 inch extrudates. The extrudates were dried in an oven at 250° F. (121° C.) for 12 hours and calcined at 1000° F. (538° C.) for 3 hours. The catalyst was designated as Catalyst 9 and the composition and properties of the catalyst are specified in Table 3.

EXAMPLE 10

A hydrogenation catalyst comprising an L-zeolite molecular sieve support material was prepared for comparison with the hydrogenation catalysts of the present invention. The catalyst was prepared by dissolving 900 grams of L-zeolite (manufactured by the Linde Division of Union Carbide) and 450 grams of ammonium nitrate in 15,185.0 grams of distilled water. The slurry was filtered and washed.

The filter cake was mildly ion exchanged with ammonium nitrate in water at a temperature of 70° F. (21° C.) for a period of 2 hours. The slurry was filtered and washed. The mild ion exchanging procedure was repeated again as described above.

The filter cake was severely ion exchanged with ammonium nitrate in water and heated, under reflux, at a temperature of about 153° F. (67° C.) for a period of 3 hours. The slurry was allowed to cool while stirring, filtered, and washed twice leaving a filter cake. The filter cake was reslurried and heated to a temperature of 171° F. (77° C.) and allowed to cool with stirring until the temperature of the slurry reached 144° F. (62° C.). The slurry was allowed to settle for 12 hours, filtered, and allowed to dry at 70° F. (21° C.) for a period of 12 hours.

The ion exchanged filter cake was co-impregnated using incipient wetness techniques with an aqueous solution of a sufficient amount of tetraamine palladium chloride and tetraamine platinum chloride in water to provide a hydrogenation catalyst having 0.25 wt % elemental palladium and 0.25 wt % elemental platinum. The L-zeolite particulate comprising platinum and palladium was dried at room temperature for 12 hours.

The L-zeolite particulate comprising platinum and palladium was mixed with PHF alumina for about 2 minutes and heated in an oven at a temperature of about 250° F. (121° C.) for 12 hours in a manner so as to provide a hydrogenation catalyst comprising 60% by weight L-zeolite support component and 40% by weight alumina. The particulate was ground into a powder, moistened with water, and extruded into 1/16 inch extrudates. The extrudates were dried in an oven at 250° F. (121° C.) for 12 hours and calcined at 1000° F. (538° C.) for 3 hours. The catalyst was designated as Catalyst 10 and the composition and properties of the catalyst are specified in Table 3.

EXAMPLE 11

A hydrogenation catalyst comprising an omega-zeolite molecular sieve support material was prepared for comparison with the hydrogenation catalysts of the present invention. The catalyst was prepared by dissolving 8.33 lbs of sodium hydroxide, 9.0 lbs of sodium aluminate, 22.7 lbs of tetramethyl ammonium hydroxide, and 81.7 lbs of a silica sol (Ludox HS-40 manufactured by Ludox Corporation) in 64.0 lbs of distilled water in an autoclave. The autoclave was sealed and maintained at a temperature of 212° F. (100° C.) with a mixer speed of 60 rpm for a period of 96 hours. The slurry was cooled with stirring for a period of 12 hours, filtered, and washed.

The filter cake was ion exchanged with ammonium nitrate in water and heated, under reflux, at a temperature of about 160° F. (71° C.) for a period of 3 hours. The slurry was allowed to cool while stirring for 12 hours and allowed to settle for a period of 3 hours. The slurry was decanted, filtered, and the filter cake dried at 70° F. (21 ° C.) for a period of 12 hours. The filter cake was ion exchanged two more times in accordance with the above procedure and washed with water.

The ion exchanged filter cake was co-impregnated using incipient wetness techniques with an aqueous solution of a sufficient amount of tetraamine palladium chloride and tetraamine platinum chloride in water to provide a hydrogenation catalyst having 0.25 wt % elemental palladium and 0.25 wt % elemental platinum. The omega-zeolite particulate comprising platinum and palladium was dried at room temperature for 12 hours.

The omega-zeolite particulate comprising platinum and palladium was mixed with PHF alumina for about 2 minutes and heated in an oven at a temperature of about 250° F. (121° C.) for 12 hours in a manner so as to provide a hydrogenation catalyst comprising 60% by weight omega-zeolite support component and 40% by weight alumina. The particulate was ground into a powder, moistened with water, and extruded into 1/16 inch extrudates. The extrudates were dried in an oven at 250° F. (121° C.) for 12 hours and calcined at 1000° F. (538° C.) for 3 hours. The catalyst crush strength was determined to be 1.79 lb/ram. The catalyst was designated as Catalyst 11 and the composition and properties of the catalyst are specified in Table 3.

EXAMPLE 12

A feedstock consisting of hydrogenated light catalytic cycle oil was prepared from light catalytic cycle oil obtained from the Amoco Oil Texas City Refinery. The light catalytic cycle oil was hydrotreated in a high-pressure trickle-bed unit at a pressure of 300 psig and a temperature of 600° F., to a sulfur level of 378 ppm. The light catalytic cycle oil and hydrotreated light catalytic cycle oil properties are described in Table 2.

TABLE 2

| FEEDSTOCK PROPERTIES | | |
|---|---|---|
| | LCCO | HT LCCO |
| API Gravity | 21.2 | 24.0 |
| Mass Spec Analysis, wt %* | | |
| Saturates | 36.0 | 33.2 |
| Aromatics | 64.0 | 66.8 |
| Mono- | 23.4 | 37.9 |
| Di- | 35.2 | 24.6 |
| Tri- | 4.1 | 4.3 |
| FIA Aromatics (ASTM D 1319) | — | 62.0 |
| Elemental Analysis (ASTM C-730) | | |
| Carbon, wt % | 88.90 | 88.75 |
| Hydrogen, wt % | 10.40 | 11.06 |
| Sulfur, ppm | 6700 | 378 |
| Nitrogen, ppm | 310 | 165 |
| H/C, Mole Ratio | 1.40 | 1.48 |
| Cetane Number (calc.) | 27.8 | 31.2 |

*Published in Analytical Chemistry, 43(11), pages 1425-1434 (1971)

EXAMPLE 13

The feedstock of Example 12 was hydrogenated over the catalysts produced in Examples 1 through 11. Catalyst performance was evaluated using a bench scale, isothermal reactor having a ¾-inch internal diameter and a thermowell. Operation was downflow with once-through hydrogen and oil. Each catalyst was used in the form of 1/16-inch extrudates and each catalyst charge was approximately 20 g. The catalyst was supported near the center of the reactor on a layer of 3 mm Pyrex glass beads, and a preheat zone of 5 mm beads was provided above the catalyst bed.

Each catalyst was pretreated prior to testing by injecting hydrogen through the reactor at a flowrate of 0.6 SCFH for 2 hours. Reactor conditions were maintained at 600° F. and 1200 psig during the pretreatment step.

Operating conditions for the runs were approximately a pressure of 1200 psig, a temperature of 600° F., a liquid hourly space velocity (LHSV) of 1.0 hr$^{-1}$, and a hydrogen injection rate of 4000 SCF/Bbl.

Over each 24-hour period, at least a 6-hour sample of product was collected in a nitrogen-purged receptacle. Nitrogen purging was performed to remove hydrogen sulfide. The product was analyzed for API gravity, sulfur content (elemental) by X-ray fluorescence, nitrogen content, aromatics content by Mass Spec. Analysis as published in *Analytic Chemistry*, 43(11), pages 1425-1434 (1971), and hydrogen to carbon ratio. Process and product calculations were performed to measure percent aromatics saturation, percent volume expansion, and product cetane number. The cetane number was provided by an empirical correlation which determines cetane number from product properties such as API gravity and the boiling point temperature at atmospheric pressure, at which 50 vol % of the distillate feed or product stream is vaporized.

The catalyst composition, process conditions, product properties, and process calculations for Catalysts 1 through 11 described in Examples 1 through 11 are specified in Table 3.

Catalyst 3, having 0.50 wt % palladium and no platinum on a support comprising borosilicate, provided above-average desulfurization, dearomatization performance, cetane number improvement, and volume expansion. Denitrogenation performance was outstanding. The performance parameters measured for Catalyst 3 comprising only palladium on a support comprising borosilicate were generally above average but not as good as processes utilizing Catalysts 1 or 2 comprising both platinum and palladium.

Catalyst 4, having 0.50 wt % platinum and no palla-

TABLE 3

DISTILLATE DEAROMATIZATION

| | CATALYST | | | | | | | | | | |
|---|---|---|---|---|---|---|---|---|---|---|---|
| | 1 | 2 | 3 | 4 | 5 | 6 | 7 | 8 | 9 | 10 | 11 |
| Catalyst Compostion | | | | | | | | | | | |
| Support Material | BORO.* | BORO. | BORO. | BORO. | BORO. | ALUM. | ZSM-5 | ZSM-5 | GALLO. | L-ZEOL. | ∞-ZEOL. |
| Silicon to M Atomic Ratio (M = Boron, Alumina, or Gallium) | 24:1 | 24:1 | 24:1 | 24:1 | 24:1 | N/A | 30:1 | 120:1 | 47:1 | 3:0:1 | 3:3:1 |
| Palladium, wt. % | 0.25 | 0.25 | 0.50 | 0.00 | 0.25** | 0.25 | 0.25 | 0.25 | 0.25 | 0.25 | 0.25 |
| Platinum, wt % | 0.25 | 0.25 | 0.00 | 0.50 | 0.25** | 0.25 | 0.25 | 0.25 | 0.25 | 0.25 | 0.25 |
| Sieve Conc. in Support | 40 | 40 | 40 | 40 | 40 | 0 | 60 | 60 | 60 | 60 | 60 |
| Process Conditions | | | | | | | | | | | |
| Temperature, °F. | 600 | 600 | 600 | 600 | 600 | 600 | 600 | 600 | 600 | 600 | 600 |
| Pressure, psig | 1200 | 1200 | 1200 | 1200 | 1200 | 1200 | 1200 | 1200 | 1200 | 1200 | 1200 |
| Hydrogen Rate, SCF/Bbl | 4000 | 4000 | 4000 | 4000 | 4000 | 4000 | 4000 | 4000 | 4000 | 4000 | 4000 |
| LHSV, hr$^{-1}$ | 1.0 | 1.0 | 1.0 | 1.0 | 1.0 | 1.0 | 1.0 | 1.0 | 1.0 | 1.0 | 1.0 |
| Product Properties and Process Calculations | | | | | | | | | | | |
| API Gravity | 32.9 | 33.4 | 29.6 | 27.1 | 27.0 | 27.5 | 29.1 | 28.1 | 24.5 | 28.3 | 30.3 |
| Sulfur, ppm | 7 | 8 | 31 | 72 | 185 | 97 | 40 | 57 | 304 | 66 | 47 |
| Nitrogen, ppm | 1 | 1 | 1 | 1 | 2 | 27 | 5 | 25 | 53 | 3 | 3 |
| Aromatics, wt. % | 10.5 | 8.1 | 34.7 | 53.3 | 52.1 | 49.6 | 35.3 | 44.0 | 62.0 | 45.9 | 36.6 |
| % Aromatic Saturation | 83 | 87 | 44 | 14 | 16 | 20 | 43 | 29 | 0 | 26 | 41 |
| H/C Ratio, mole | 1.83 | 1.85 | 1.71 | 1.61 | 1.62 | 1.63 | 1.70 | 1.66 | 1.52 | 1.64 | 1.70 |
| Volume Expansion, % | 5.4 | 5.7 | 3.5 | 2.0 | 1.9 | 2.2 | 3.2 | 2.6 | 0.3 | 2.7 | 3.9 |
| Cetane Number increase | 12.8 | 13.6 | 7.8 | 4.2 | 4.0 | 4.7 | 7.0 | 5.6 | 0.7 | 5.9 | 8.8 |
| Crush Strength, lb/mm | | 1.49 | | | | 0.35 | 1.25 | | | | 1.79 |

*Acidity Treatment Procedure
**Physical Mixture of Pd/Pt

Catalyst 1, having 0.25 wt % palladium and 0.25 wt % platinum on a support comprising borosilicate (including the borosilicate acidity treatment step), provided outstanding dearomatization performance, desulfurization, denitrogenation, volume expansion, and cetane number improvement.

Catalyst 2, having 0.25 wt % palladium and 0.25 wt % platinum on a support comprising borosilicate (without the borosilicate acidity treatment), also provided outstanding dearomatization performance, desulfurization, denitrogenation, volume expansion, and cetane number improvement. Overall, the performance of Catalyst 2, without the acidity treatment, was slightly better than the performance of Catalyst 1 with the acidity treatment.

dium on a support comprising borosilicate, provided below average desulfurization, volume expansion, and cetane number improvement. Denitrogenation performance was outstanding while dearomatization performance was poor. Catalyst 4, comprising only platinum was clearly less effective than Catalysts 1 and 2 comprising both platinum and palladium, and generally less effective than Catalyst 3 comprising only palladium.

Catalyst 5, having 0.25 wt % palladium and 0.25 wt % platinum on a support comprising borosilicate and formed as a physical mixture of Catalysts 3 and 4, provided above average denitrogenation and below average or poor dearomatization performance, desulfurization, volume expansion, and cetane number improvement. The performance parameters measured for Catalyst 5, comprising a physical mixture of Catalysts 3 and 4, were clearly inferior to Catalysts 1 and 2 where the palladium and platinum were both incorporated onto generally all of the catalyst. This further illustrates that palladium and platinum combined together on a support comprising borosilicate provides far superior performance to a physical mixture of catalysts having platinum and palladium incorporated separately, even where the overall level of metals remains constant.

Catalyst 6, comprising a prior art catalyst having 0.25 wt % palladium and 0.25 wt % platinum on an alumina support, provided below average desulfurization, denitrogenation, dearomatization performance, volume expansion, and cetane number improvement. The performance parameters measured for prior art Catalyst 6, wherein the support consisted essentially of alumina, were clearly inferior to Catalysts 1 and 2 wherein the support comprised about 40% by weight borosilicate. This further illustrates that palladium and platinum combined on a support comprising borosilicate provides far superior results to the same combination and concentration of metals on an alumina support.

Catalyst 7, having 0.25 wt % palladium and 0.25 wt % platinum on a support comprising ZSM-5 having a silicon to aluminum atomic ratio of 30:1, provided above average desulfurization, denitrogenation, and dearomatization performance and average cetane number improvement and volume expansion. The performance parameters for Catalyst 7, wherein the support component comprised about 60% by weight ZSM-5, were inferior to Catalysts I and 2 of the present invention.

Catalyst 8, having 0.25 wt % palladium and 0.25 wt % platinum on a support comprising ZSM-5 having a silicon to aluminum atomic ratio of about 120:1, provided average desulfurization, denitrogenation, dearomatization performance, cetane number improvement, and volume expansion. The performance parameters for Catalyst 8, wherein the support component comprised about 60% by weight ZSM-5, were inferior to Catalysts 1 and 2 of the present invention. Catalyst 8, comprising a ZSM-5 support component having a higher silicon to aluminum atomic ratio of 120:1 provided slightly inferior results to Catalyst 7, comprising a ZSM-5 support component having a lower silicon to aluminum atomic ratio of 30:1.

Catalyst 9, having 0.25 wt % palladium and 0.25 wt % platinum on a support comprising gallosilicate provided poor desulfurization, denitrogenation, dearomatization performance, cetane number improvement, and volume expansion. Catalyst 9 was clearly inferior to all of the catalysts tested and particularly Catalysts 1 and 2 of the present invention.

Catalyst 10, having 0.25 wt % palladium and 0.25 wt % platinum on a support comprising L-zeolite provided average desulfurization, denitrogenation, dearomatization performance, cetane number improvement, and volume expansion. The performance parameters for Catalyst 10, wherein the support component comprised about 60% by weight L-zeolite, were inferior to Catalysts 1 and 2 of the present invention.

Catalyst 11, having 0.25 wt % palladium and 0.25 wt % platinum on a support comprising omega-zeolite, provided above average desulfurization, denitrogenation, cetane number improvement, and volume expansion and average dearomatization performance. The performance parameters for Catalyst 11, wherein the support component comprised about 60% by weight omega-zeolite, were better than the other zeolitic Catalysts 7, 8, and 10 but inferior to Catalysts 1 and 2 of the present invention.

Other embodiments of the invention will be apparent to those skilled in the art from a consideration of this specification or from practice of the invention disclosed herein. It is intended that this specification be considered as exemplary only with the true scope and spirit of the invention being indicated by the following claims.

That which is claimed is:

1. A hydrogenation catalyst suitable for hydrogenation of a hydrocarbon feedstock comprising from about 0.1% to about 2.0% by weight of palladium and from about 0.1% to about 2.0% by weight of platinum, each incorporated onto a support comprising a refractory oxide matrix and borosilicate, wherein said borosilicate, calculated as oxide, comprises from about 30% to about 60% by weight of said support.

2. The catalyst of claim 1 wherein said support comprises from about 35% by weight to about 45% by weight borosilicate.

3. The catalyst of claim 1 wherein said borosilicate comprises HAMS-1B.

4. The catalyst of claim 1 wherein said refractory oxide matrix comprises an alumina binder.

5. The catalyst of claim 1 wherein the crush strength of said catalyst is at least 1.3 lb/min.

6. The catalyst of claim 1 wherein said catalyst comprises from about 0.2% to about 1.5% by weight of platinum and from about 0.2% to about 1.5% by weight of palladium.

7. The catalyst of claim 1 wherein said catalyst comprises palladium and platinum in a weight ratio ranging from about 5:1 to about 1:5.

* * * * *